(12) United States Patent
Sakamoto et al.

(10) Patent No.: US 10,353,582 B2
(45) Date of Patent: Jul. 16, 2019

(54) TERMINAL APPARATUS, TERMINAL CONTROL METHOD, AND NON-TRANSITORY COMPUTER READABLE STORAGE MEDIUM

(71) Applicant: YAHOO JAPAN CORPORATION, Tokyo (JP)

(72) Inventors: Ryuki Sakamoto, Tokyo (JP); Yuta Suzuki, Tokyo (JP); Sakiko Nishi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 212 days.

(21) Appl. No.: 15/202,004

(22) Filed: Jul. 5, 2016

(65) Prior Publication Data

US 2017/0038920 A1 Feb. 9, 2017

(30) Foreign Application Priority Data

Aug. 6, 2015 (JP) .................................. 2015-155955

(51) Int. Cl.
*G06F 3/0488* (2013.01)
*G06F 17/27* (2006.01)

(52) U.S. Cl.
CPC ........ *G06F 3/04886* (2013.01); *G06F 17/276* (2013.01)

(58) Field of Classification Search
CPC .. G06F 3/0482; G06F 3/04883; G06F 17/276; G06F 3/04886
See application file for complete search history.

(56) References Cited

U.S. PATENT DOCUMENTS

| 6,801,659 | B1 * | 10/2004 | O'Dell | G06F 3/0237 382/185 |
| 9,529,449 | B1 * | 12/2016 | Chen | G06F 3/0489 |
| 2008/0180403 | A1 * | 7/2008 | Park | G06F 3/0237 345/173 |
| 2008/0291171 | A1 * | 11/2008 | Shin | G06F 3/0481 345/168 |

(Continued)

FOREIGN PATENT DOCUMENTS

| JP | 2010-015570 A | 1/2010 |
| JP | 2012-168939 A | 9/2012 |
| JP | 2012-168976 A | 9/2012 |

(Continued)

OTHER PUBLICATIONS

Jan. 5, 2016 Notice of Refusal issued in Japanese Patent Application No. 2015-155955.

*Primary Examiner* — William L Bashore
*Assistant Examiner* — Gregory A Distefano
(74) *Attorney, Agent, or Firm* — Oliff PLC

(57) ABSTRACT

A terminal apparatus according to the present application includes a receiving unit, a first display control unit, and a second display control unit. The receiving unit receives an operation to designate a first area. When the receiving unit has received the operation to designate the first area, the first display control unit displays first input candidates. When an operation to designate a second area has been received, the second display control unit displays second input candidates corresponding to a first input candidate determined to be selected among the first input candidates.

14 Claims, 9 Drawing Sheets

(56) References Cited

U.S. PATENT DOCUMENTS

2015/0347004 A1* 12/2015 Garg .................. G06F 3/04886
　　　　　　　　　　　　　　　　　　　　　　345/173
2016/0041965 A1* 2/2016 Ghassabian ............ G06F 3/005
　　　　　　　　　　　　　　　　　　　　　　715/261

FOREIGN PATENT DOCUMENTS

| JP | 2013-219637 A | 10/2013 |
| JP | 2014-191782 A | 10/2014 |
| JP | 3197051 U | 4/2015 |

* cited by examiner

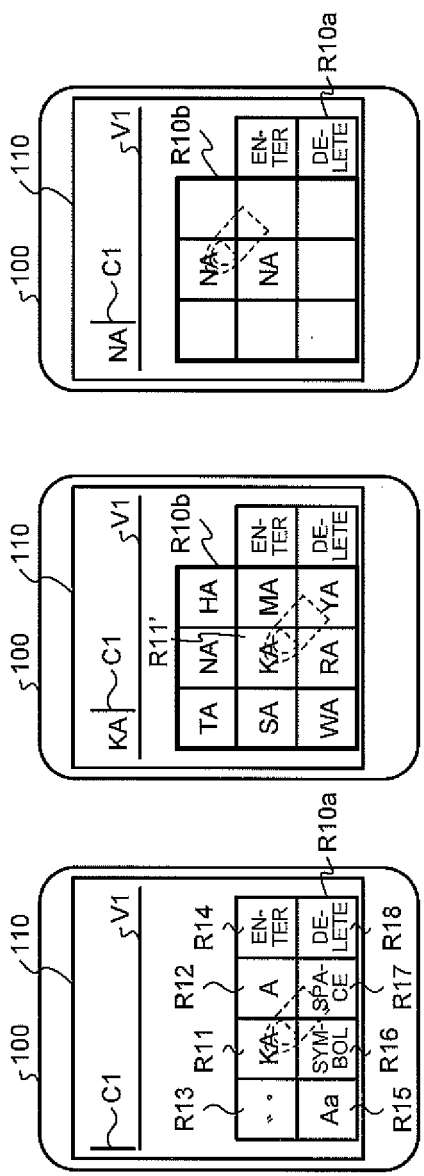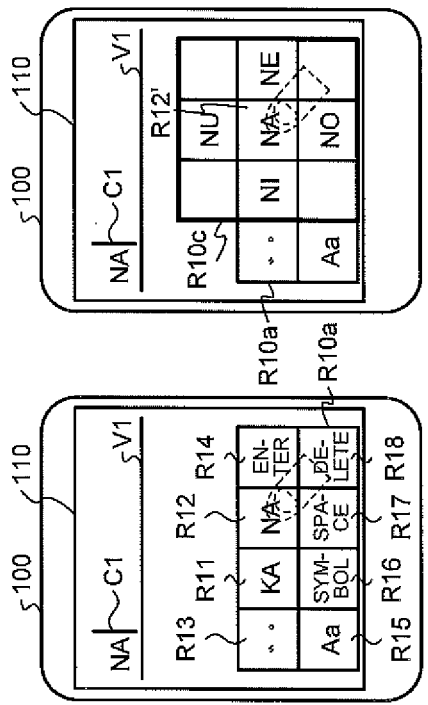

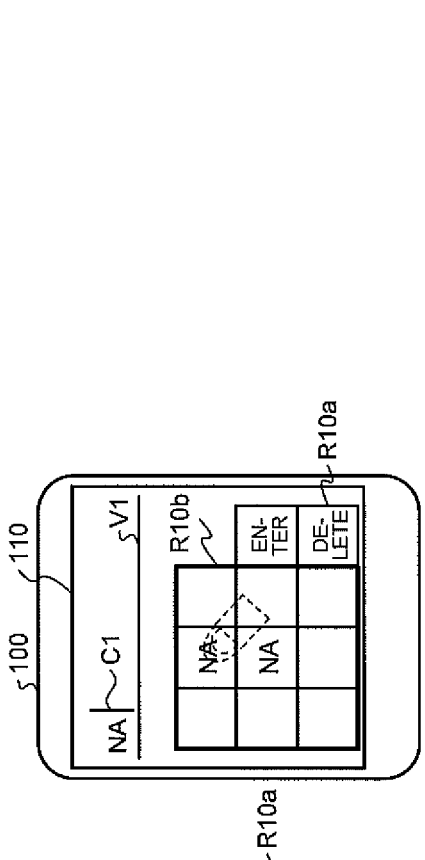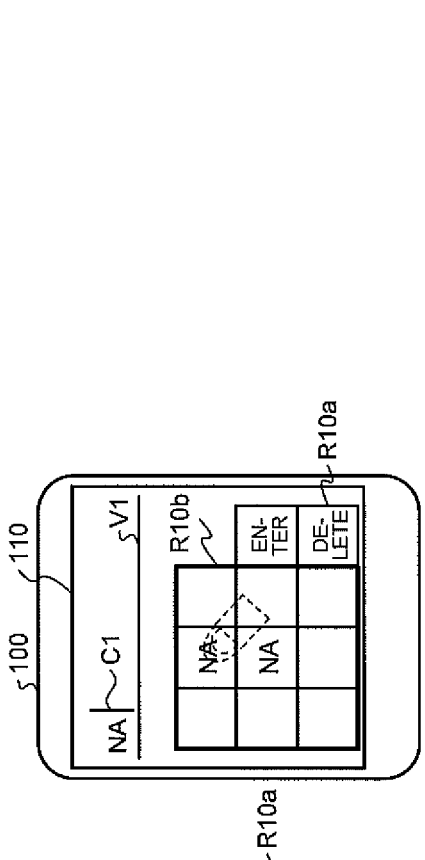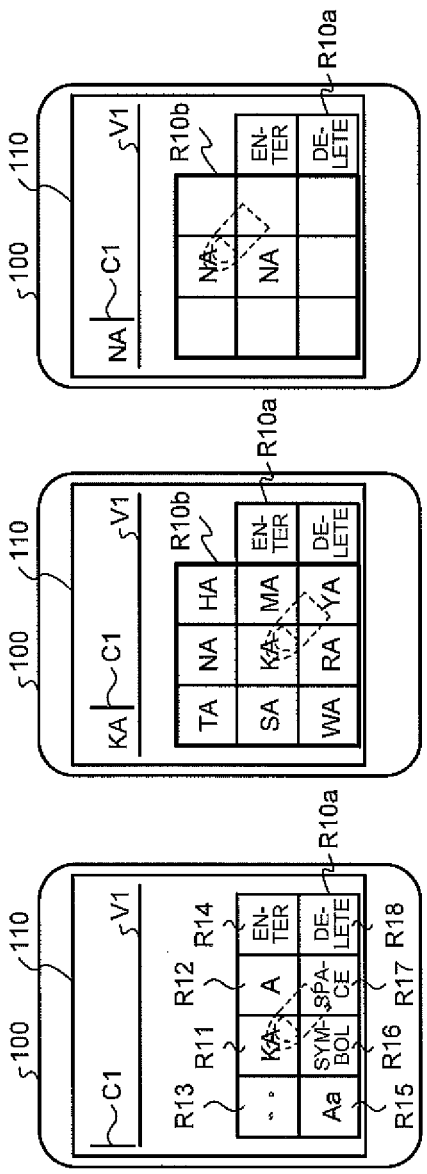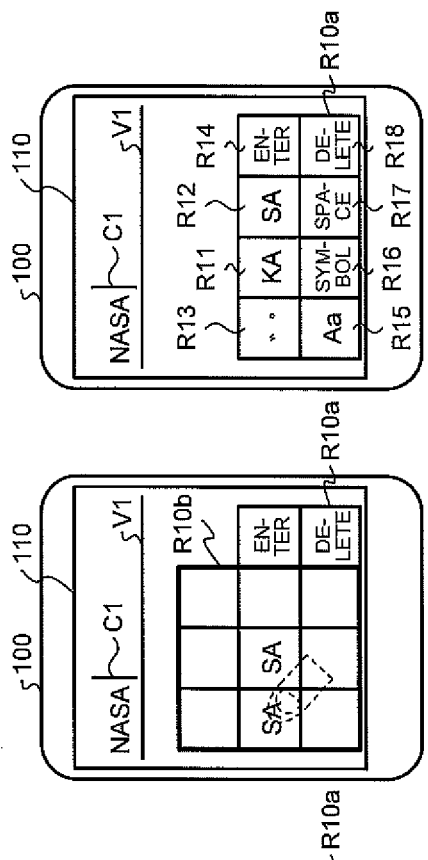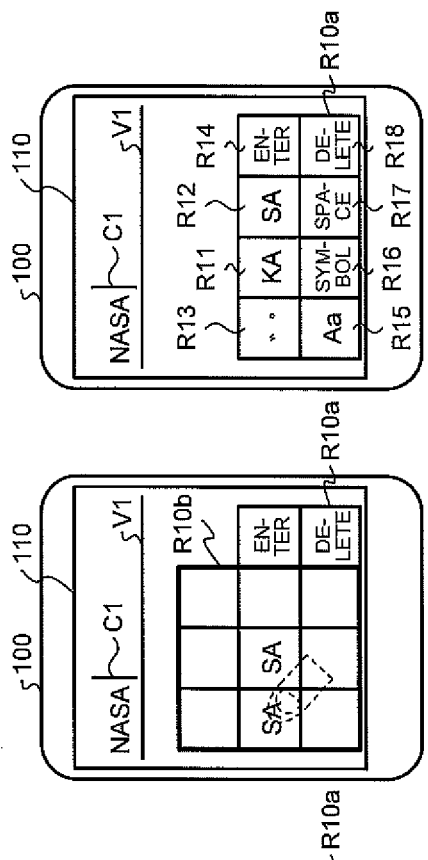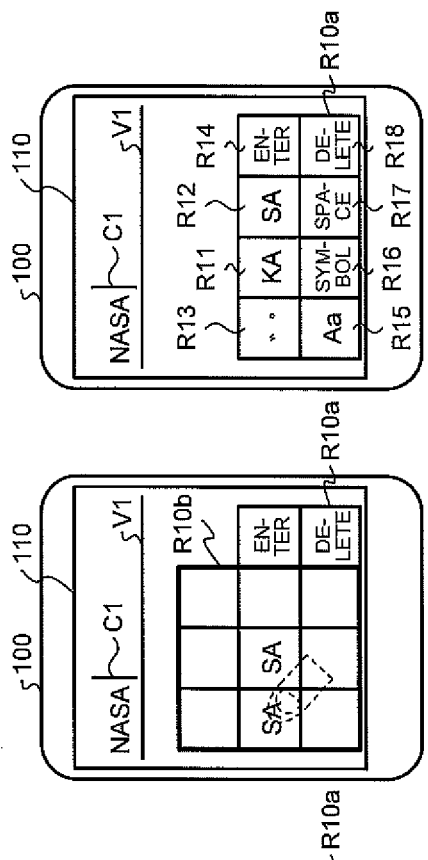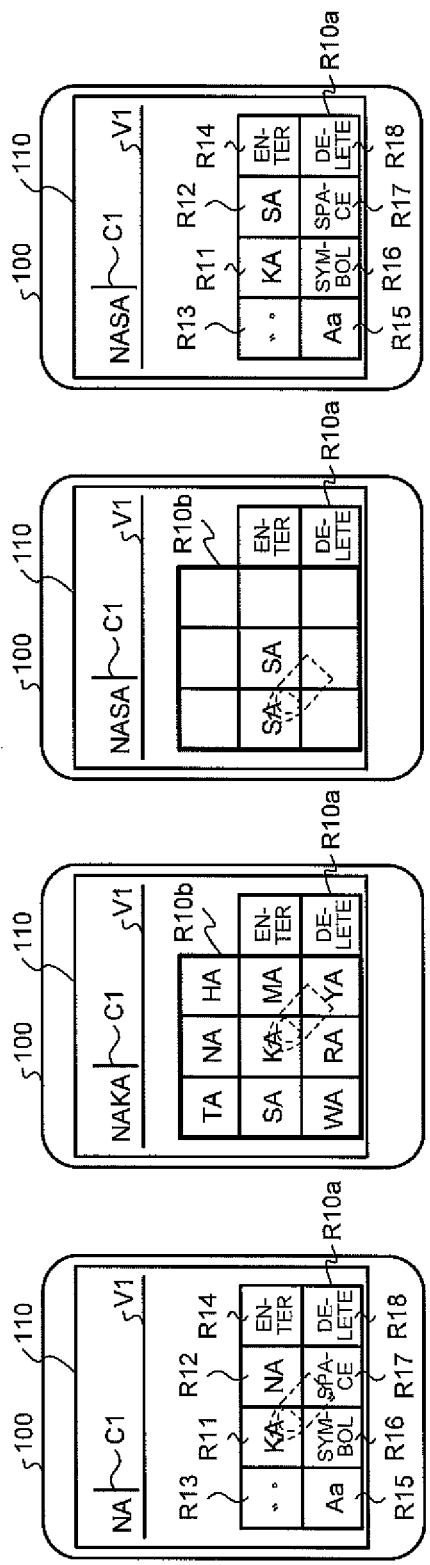

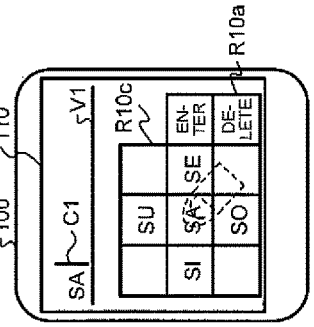
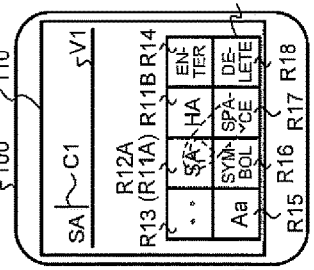
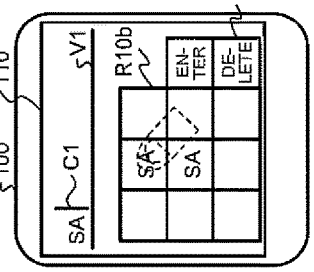
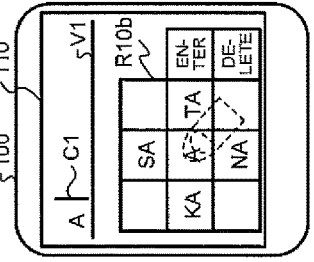
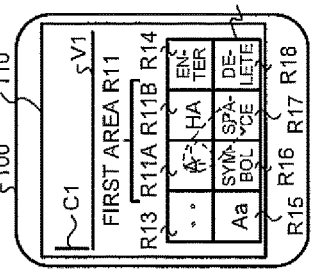
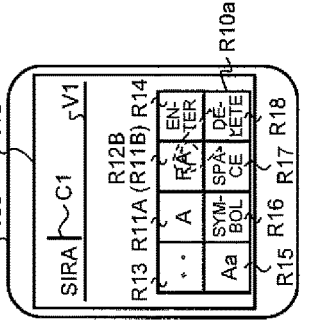
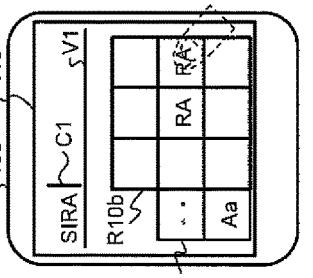
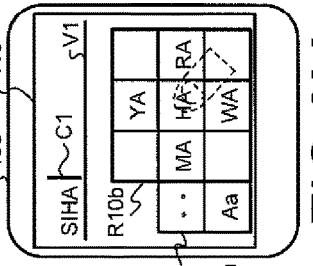
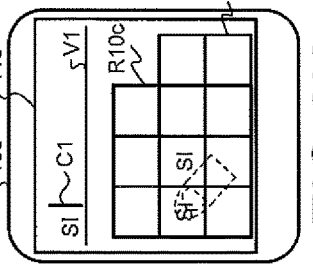

OPERATION AREA

TERMINAL APPARATUS, TERMINAL CONTROL METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-155955 filed in Japan on Aug. 6, 2015.

BACKGROUND OF THE INVENTION

1. Field of the Invention

The present invention relates to a terminal apparatus, a terminal control method, and a non-transitory computer readable storage medium having stored therein a terminal control program.

2. Description of the Related Art

In recent years, smartphones, tablet type terminals, and smartwatches, for example, have become widespread as terminal apparatuses with a touch panel type liquid crystal display installed thereon. A touch panel surface is touched with a finger or the like, so that various kinds of operations such as a character input operation are received from a user.

The terminal apparatus with the touch panel type liquid crystal display installed thereon described above displays an operation area for receiving various kinds of operations concerning character input in place of a physical keyboard or character input buttons, for example.

The operation area generally includes a total of 20 areas in which 10 Japanese input areas for receiving character input corresponding to the "A row" in the Japanese syllabary and areas for receiving a deleting operation, a line feed operation, and the like are combined.

A technique that supports Japanese input is known as a technique concerning a character input operation in the touch panel. A technique is known that displays a plurality of character input areas with a first touched position at the center and determines a character corresponding to a character input area designated by a user to be an input character, for example (Japanese Patent Application Laid-open No. 2010-15570, for example).

However, the above conventional technique is not necessarily an input interface having high usability. In a terminal apparatus having a small display screen, a user has difficulty in handling when the operation area including the 20 areas or the character input areas described above are displayed, for example. For this reason, the above conventional technique is not necessarily an input interface having high usability.

SUMMARY OF THE INVENTION

It is an object of the present invention to at least partially solve the problems in the conventional technology.

According to one aspect of an embodiment, a terminal apparatus includes a receiving unit that receives an operation to designate a first area. The terminal apparatus includes a first display control unit that, when the receiving unit has received the operation to designate the first area, displays first input candidates. The terminal apparatus includes a second display control unit that, when an operation to designate a second area has been received, displays second input candidates corresponding to a first input candidate determined to be selected among the first input candidates.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A to 1G are diagrams of an example of character input processing according to an embodiment;

FIGS. 5A to 5G are diagrams of an example of input character determination processing according to a modification;

FIGS. 6A to 6M are diagrams of an example of character input processing according to the modification;

DETAILED DESCRIPTION OF THE PREFERRED EMBODIMENTS

Figure 2:
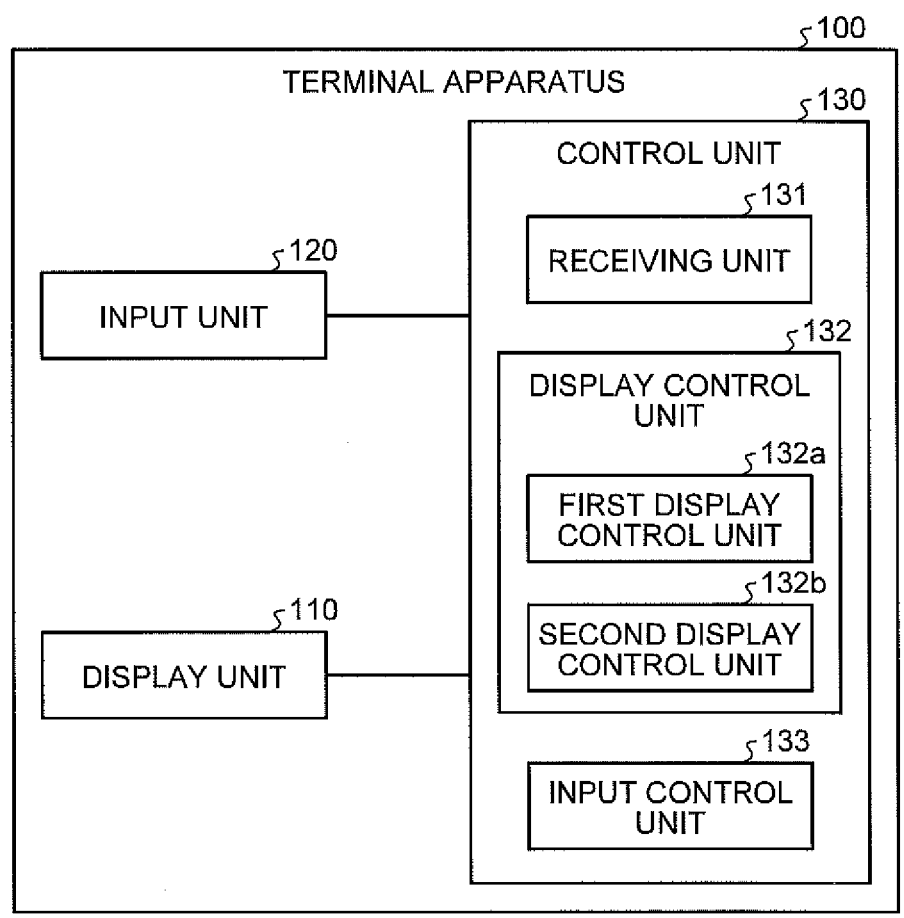
FIG. 2 is a diagram of a configuration example of a terminal apparatus according to the embodiment.

The following describes forms (hereinafter, referred to as "embodiments") to implement a terminal apparatus, a terminal control method, and a non-transitory computer readable storage medium having stored therein a terminal control program according to the present application in detail with reference to the accompanying drawings. These embodiments do not limit the terminal apparatus, the method for controlling a terminal, and the terminal control program according to the present application.

1. Character Input Processing

First, the following describes character input processing according to an embodiment with reference to FIGS. 1A to 1G. FIGS. 1A to 1G are diagrams of an example of character input processing according to the present embodiment. The character input processing according to the present embodiment is performed by a terminal apparatus 100 illustrated in FIGS. 1A to 1G. The terminal apparatus 100 is a wearable type terminal or a tablet type terminal, for example, and includes a display unit 110 such as a liquid crystal display. The terminal apparatus 100 employs a touch panel and receives various kinds of operations by the display unit 110 being touched with a finger or the like. The terminal apparatus 100 according to the present embodiment displays an interface for inputting characters in accordance with an area selected by a user and thereby receives character input from the user. The following describes this point with reference to FIGS. 1A to 1G.

First, in the present embodiment, it is assumed that the terminal apparatus 100 is a watch type terminal (called a smartwatch or the like) as a kind of the wearable type terminal. It is assumed here that the terminal apparatus 100 has been switched to a character input mode that receives character input from the user. In that case, the terminal apparatus 100 displays an input column V1 that displays a character received from the user as an input character and a cursor C1 that indicates a position at which a character is input in the input column V1 on the display unit 110.

The terminal apparatus 100 displays an operation area R10a in which various kinds of operations concerning character input are performed by the user. Specifically, the terminal apparatus 100 displays the operation area R10a containing an area R11 to an area R18 on the display unit 110.

In the example in FIG. 1A, the terminal apparatus 100 displays the operation area R10a containing a first area R11 as an area for use in character input, a second area R12 for use in the case of character input, an area R13 concerning input of a voiced consonant and a p-sound in the kana syllabary, an area R14 for determining a character displayed in the input column V1 to be the input character, an area R15 for switching between Japanese input and alphabet input, an area R16 for inputting various kinds of symbols, an area R17 for inputting a blank character, and an area R18 for deleting the character displayed in the input column V1. As illustrated in FIG. 1A, the terminal apparatus 100 initially displays "KA" in the first area R11 and initially displays "A" in the second area R12.

In this state, the terminal apparatus 100, when a designation operation to designate the first area R11 has been received from the user, displays first input candidates as candidates of a character to be input by the user in an operation area R10b with a display position of the first area R11 at the center.

As illustrated in FIG. 1B, it is assumed that the user has selected the first area R11 in which "KA" is displayed, for example. In that case, the terminal apparatus 100 displays the operation area R10b with the display position of the first area R11 at the center. In this situation, the terminal apparatus 100 displays "KA," "SA," "TA," "NA," "HA," "MA," "YA," "RA," and "WA" as consonants corresponding to the "A" row in the Japanese syllabary as the first input candidates in the operation area R10b. In this situation, the user has selected an area R11' corresponding to the first area R11 in the operation area R10b. The area R11' corresponds to a first input candidate "KA," and the terminal apparatus 100 displays "KA" in the input column V1 by the fact that the area R11' is selected. In this situation, the terminal apparatus 100 moves the cursor C1 behind the displayed character "KA." The terminal apparatus 100 continues to display the operation area R10b illustrated in FIG. 1B unless the finger is removed from the display unit 110.

When the finger is slid (called "swipe" or the like) from the area corresponding to "KA" in the operation area R10b, and an area corresponding to any of "SA," "TA," "NA," "HA," "MA," "YA," "RA," and "WA" is selected, the terminal apparatus 100 changes the character displayed in the input column V1 into the selected first input candidate. As illustrated in FIG. 1C, it is assumed that the user has slid the finger from the area corresponding to "KA" in the operation area R10b to designate the area corresponding to the first input candidate "NA," for example. In that case, the terminal apparatus 100 changes "KA" displayed in the input column V1 into the designated first input candidate "NA." The terminal apparatus 100 continues to display the operation area R10b illustrated in FIG. 1C unless the finger is removed from the display unit 110.

When the finger is removed from the operation area R10b, the terminal apparatus 100 determines the selection of the first input candidate displayed in the area designated until then. It is assumed that, in FIG. 1C, the finger has been removed from the state in which the position within the area corresponding to the first input candidate "NA" is designated, for example. In that case, the terminal apparatus 100 determines that "NA" has been selected from the first input candidates displayed in the operation area R10b. In the present embodiment, the operation to remove the finger from an area is a determination operation to cause the terminal apparatus 100 to determine character selection in this way.

When the determination operation of the first input candidate has been performed, the terminal apparatus 100 makes the operation area R10b hidden and displays the first input candidate determined to be selected "NA" in the second area R12 of the operation area R10a as illustrated in FIG. 1D.

After the selection of the first input candidate has been determined, when receiving a designation operation to designate a position within the second area R12, the terminal apparatus 100 displays second input candidates corresponding to the input candidate determined to be selected among the first input candidates in an operation area R10c with a display position of the second area R12 at the center.

It is assumed that after determining the selection of "NA" to be the first input candidate, the user has performed the designation operation to designate the position within the second area R12 in which "NA" is displayed as illustrated in FIG. 1D as has been described above, for example. In that case, the terminal apparatus 100 displays the operation area R10c with the display position of the second area R12 at the center. In this situation, the terminal apparatus 100 displays "NA," "NI," "NU," "NE," and "NO" as characters corresponding to the "NA" column of the Japanese syllabary as the second input candidates in the operation area R10c. In this situation, the user has selected an area R12' corresponding to the second area R12 in the operation area R10c. The area R12' is an area corresponding to a second input candidate "NA," and the terminal apparatus 100 keeps displaying "NA" in the input column V1 by the fact that the area R12' is selected. The terminal apparatus 100 continues to display the operation area R10c illustrated in FIG. 1E unless the finger is removed from the display unit 110.

When an area corresponding to any of the second input candidates "NI," "NU," "NE," and "NO" is further selected by a slide operation or the like, the terminal apparatus 100 changes the character displayed in the input column V1 into the selected second input candidate. As illustrated in FIG. 1E, it is assumed that the user has slid the finger from the area corresponding to "NA" in the operation area R10c to select a position within the area corresponding to the second input candidate "NI," for example. In that case, the terminal apparatus 100 changes "NA" displayed in the input column V1 into the selected second input candidate "NI."

When the determination operation to remove the finger is performed in the operation area R10c, the character in the area selected until then is determined to be the input character. It is assumed that, in FIG. 1F, the finger has been removed from the state in which the position within the area corresponding to the second input candidate "NI" is selected, for example. In that case, the terminal apparatus 100 determines "NI" among the second input candidates displayed in the operation area R10c to be the input character. Through the removal of the finger, the terminal apparatus 100 makes the operation area R10c hidden and displays "A" in the second area R12 of the operation area R10a as illustrated in FIG. 1G. In other words, upon determination of the input character, the terminal apparatus 100 restores an initial state in the character input mode. When desiring to further continuously input a character, the user repeats the stepwise operations using the operation area R10a to the operation area R10c illustrated in FIGS. 1A to 1G. With this operation, the terminal apparatus 100 will further display a character following the character displayed in the input column V1.

The terminal apparatus 100 according to the present embodiment thus displays the first input candidates in the operation area R10b with the first area R11 at the center by the fact that the first area R11 is selected, and thereby receives the selection of the first input candidate. With this operation, the terminal apparatus 100 enables character input with less space and can thereby provide an input interface having high usability.

In addition, the terminal apparatus 100, when the second area R12 has been designated after the selection of the first input candidate has been determined, displays the second input candidates corresponding to the determined first input candidate in the operation area R10c to receive the designation of the second input candidate. The terminal apparatus 100 thus displays the operation area R10b and the operation area R10c separately in accordance with a user operation to receive character selection, thereby enables character input with less space. The terminal apparatus 100 can also achieve the input procedure with which the user is familiar, that is, from "row" to "column" in Japanese, and can thereby provide an input interface that enables high-precision character input.

2. Configuration of Terminal Apparatus

The following describes the terminal apparatus 100 according to the present embodiment with reference to FIG. 2. FIG. 2 is a diagram of a configuration example of the terminal apparatus 100 according to the present embodiment. The terminal apparatus 100 is an information processing apparatus employing a touch panel and is a wearable terminal, a tablet type terminal, a notebook personal computer (PC), a cellular phone, or a personal digital assistant (PDA), for example. As illustrated in FIG. 2, the terminal apparatus 100 includes the display unit 110, an input unit 120, and a control unit 130.

The display unit 110 is a display device for displaying various kinds of information. The display unit 110 is implemented by a liquid crystal display, for example. The input unit 120 is an input device that receives various kinds of operations from the user. The terminal apparatus 100 according to the present embodiment employs the touch panel, and the display unit 110 and part of the input unit 120 are integral with each other.

The control unit 130 is implemented by causing a central processing unit (CPU), a micro processing unit (MPU), or the like to execute a computer program (corresponding to an example of a terminal control program) stored in an internal storage apparatus with an internal memory such as a random access memory (RAM) as a work area.

As illustrated in FIG. 2, the control unit 130 includes a receiving unit 131, a display control unit 132, and an input controller 133 and implements or executes functions and actions of information processing described below. An internal configuration of the control unit 130 is not limited to the configuration illustrated in FIG. 2 and may be another configuration so long as it performs the information processing described below.

The receiving unit 131 receives various kinds of operations from the user via the input unit 120. Specifically, the receiving unit 131 receives various kinds of user operations such as an operation to designate a character to be displayed in the operation areas (the operation area R10a to the operation area R10c, for example) displayed by the display control unit 132 described below, a slide operation to cause a finger to move along the display unit 110, and an operation to determine the selection of various kinds of input candidates.

The display control unit 132 displays the operation areas in which various kinds of operations concerning character input are performed or displays certain characters in the operation areas in accordance with the operations received by the receiving unit 131. Upon reception of information indicating the fact that the terminal apparatus 100 has been switched to the character input mode by the receiving unit 131, the display control unit 132 displays the operation area R10a on the display unit 110 as illustrated in FIG. 1A, for example. The display control unit 132 includes a first display control unit 132a and a second display control unit 132b.

The first display control unit 132a, when the receiving unit 131 has received an operation to designate the first area R11, displays the first input candidates as the candidates of the character to be input by the user. Specifically, the first display control unit 132a, when the receiving unit 131 has received the operation to designate the first area R11, displays the first input candidates in the operation area R10b with the display position of the first area R11 at the center.

When the receiving unit 131 has received an operation to designate the second area R12, the second display control unit 132b displays the second input candidates corresponding to the first input candidate determined to be selected among the first input candidates. Specifically, the second display control unit 132b, when the receiving unit 131 has received the operation to designate the second area R12 after the operation to determine the selection of the first input candidate displayed by the first display control unit 132a has been performed, displays the second input candidates corresponding to the first input candidate determined to be selected among the first input candidates in the operation area R10c with the display position of the second area R12 at the center. In this situation, the second display control unit 132b displays the operation area R10c so as to overlap with the first area R11 at least partially.

The input controller 133 controls the character to be displayed on the display unit 110. The input controller 133, when the receiving unit 131 has received an operation to select any of the first input candidates, displays the selected first input candidate in the input column V1, for example. The input controller 133, when the receiving unit 131 has received an operation to select any of the second input candidates corresponding to the selected first input candidate, displays the selected second input candidate in the input column V1 in place of the second input candidate displayed in the input column V1. The input controller 133 determines the second input candidate displayed in the input column V1 to be the input character.

The following describes processing by the receiving unit 131, the display control unit 132, the first display control unit 132a, and the second display control unit 132b.

Upon reception of information indicating the fact that the terminal apparatus 100 has been switched to the character input mode by the receiving unit 131, the display control unit 132 displays the operation area R10a containing the first area R11 and the second area R12 adjacent to each other on the display unit 110 as illustrated in FIG. 1A, for example.

The first display control unit 132a, when the receiving unit 131 has received the operation to designate the first area R11, displays the first input candidates in the operation area R10b with the display position of the first area R11 at the center.

The first display control unit 132a, when the receiving unit 131 has received an operation to designate any of the first input candidates, and while an operation to designate the operation area R10b is being received, maintains the display of the operation area R10b. When the receiving unit 131 has received a slide operation to designate the area corresponding to "NA" from the area corresponding to "KA," the first display control unit 132a displays "NA" in the central area (the area R11') among the nine areas and, except the area originally associated with "NA," makes the first input candidates displayed in the other areas hidden as illustrated in FIG. 1C. The first display control unit 132a thus displays the first input candidate associated with the area designated by the slide operation in any of the nine areas and makes the first input candidates displayed in the other areas hidden, and can thereby make the currently selected first input candidate easy to be visually recognized. The second display control unit 132b also performs similar processing. Now that the area corresponding to "NA" has been designated by the slide operation, the input controller 133 displays "NA" in place of "KA" displayed in the input column V1 until then.

In this state, when the receiving unit 131 has become unable to receive an operation to designate the area corresponding to "NA", that is, when an operation to determine the selection of the first input candidate "NA" has been performed by the user, the first display control unit 132a switches the operation area R10b to be hidden as illustrated in FIG. 1D. The display control unit 132 displays the first input candidate determined to be selected "NA" in the second area R12.

With the selection of the first input candidate determined and with the operation area R10b made hidden, when the receiving unit 131 has received the operation to designate the second area R12 in which "NA" is displayed, the second display control unit 132b displays the second input candidates in the operation area R10c with the display position of the second area R12 at the center as illustrated in FIG. 1E. In this situation, when the operation area R10b is displayed, the second display control unit 132b displays the operation area R10c so as to overlap with the operation area R10b at least partially as illustrated in FIG. 1E. Consequently, the terminal apparatus 100 can display the first input candidates and the second input candidates even with less space.

The second display control unit 132b, while the receiving unit 131 is receiving an operation to designate the operation area R10c, maintains the display of the operation area R10c. In this situation, when the receiving unit 131 has received a slide operation to designate the area corresponding to "NI" from the area corresponding to "NA," the second display control unit 132b displays "NI" in the central area (the area R12') among the nine areas and, except the area originally associated with "NI," makes the second input candidates displayed in the other areas hidden as illustrated in FIG. 1F. Now that the area corresponding to "NI" has been designated by the slide operation, the input controller 133 displays "NI" in place of "NA" displayed in the input column V1 until then.

In this state, when the receiving unit 131 has become unable to receive an operation to designate the area corresponding to "NI", that is, when an operation to determine the selection of the second input candidate "NI" has been performed by the user, the second display control unit 132b switches the operation area R10c to be hidden as illustrated in FIG. 1G, and the input controller 133 determines the second input candidate determined to be selected "NI" to be the input character. The display control unit 132 returns the character within the second area R12 to the initial state "A" from "NA."

The above-described processing is processing when the user inputs consonants. Specifically, when desiring to input a consonant, the user first selects the first area R11 to display a consonant corresponding to the "A row" (the first input candidates in the operation area R10b), and selects a "column" (the NA column, for example) containing the character desired to be input from the displayed consonants. The user then selects the second area R12 to display characters ("NA," "NI," "NU," "NE," and "NO," for example) corresponding to the "column" containing the character desired to be input and selects the character desired to be input from the displayed characters. The following describes processing when the user inputs vowels.

3. Vowel Input

Figure 3A:
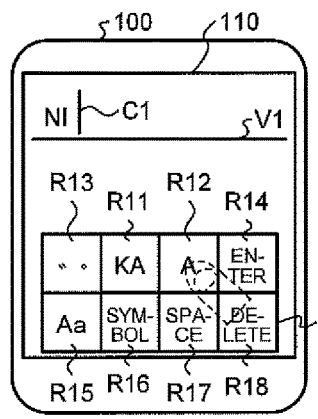
FIGS. 3A to 3D are diagrams illustrating vowel input by a user.

FIGS. 3A to 3D are diagrams illustrating vowel input by the user. FIG. 3A corresponds to FIG. 1G and illustrates a state in which "NI" is input. It is assumed that the user next desires to input a vowel "U." As described above, in the present embodiment, when desiring to input a consonant, the user uses the first area R11 in the initial state. In contrast, when desiring to input a vowel, the user uses the second area R12 in the initial state. In other words, when desiring to input a vowel, the user designates the second area R12 without designating the first area R11.

When the receiving unit 131 has thus received the operation to designate the second area R12 without designating the first area R11 in the initial state, the second display control unit 132b displays the second input candidates in an area with the second area R12 at the center.

Figure 3B:
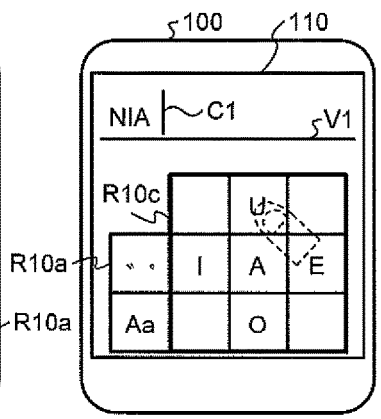

When the receiving unit 131 has received an operation to select the second area R12 in the initial state as illustrated in FIG. 3A, the second display control unit 132b displays "A row" characters (vowels) such as "A," "I," "U," "E," and "O" as the second input candidates in the operation area R10c with the display position of the second area R12 at the center as illustrated in FIG. 3B, for example. The input controller 133 displays "A" next to "NI" displayed in the input column V1.

Figure 3C:
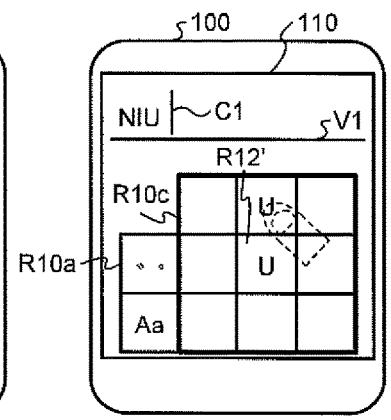

In this state, when the receiving unit 131 has received a slide operation to designate the area corresponding to "U" from the area corresponding to "A," the second display control unit 132b displays "U" in the central area among the nine areas and, except the area originally associated with "U," makes the first input candidates displayed in the other areas hidden as illustrated in FIG. 3C. The input controller 133 displays "U" in place of "A" displayed in the input column V1.

Figure 3D:
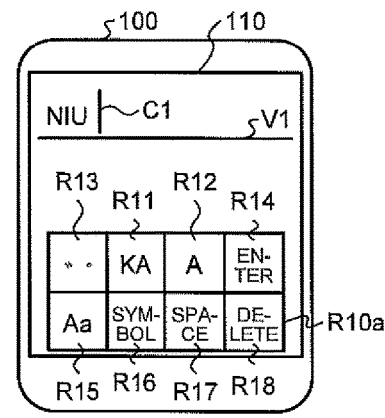

In this state, when the receiving unit 131 has become unable to receive an operation to designate the area corresponding to "U", that is, when an operation to determine the selection of the second input candidate "U" has been performed by the user, the second display control unit 132*b* switches the operation area R10*c* to be hidden as illustrated in FIG. 3D, and the input controller 133 determines the second input candidate determined to be selected "U" to be the input character.

4. Character Input Processing Procedure

Figure 4:
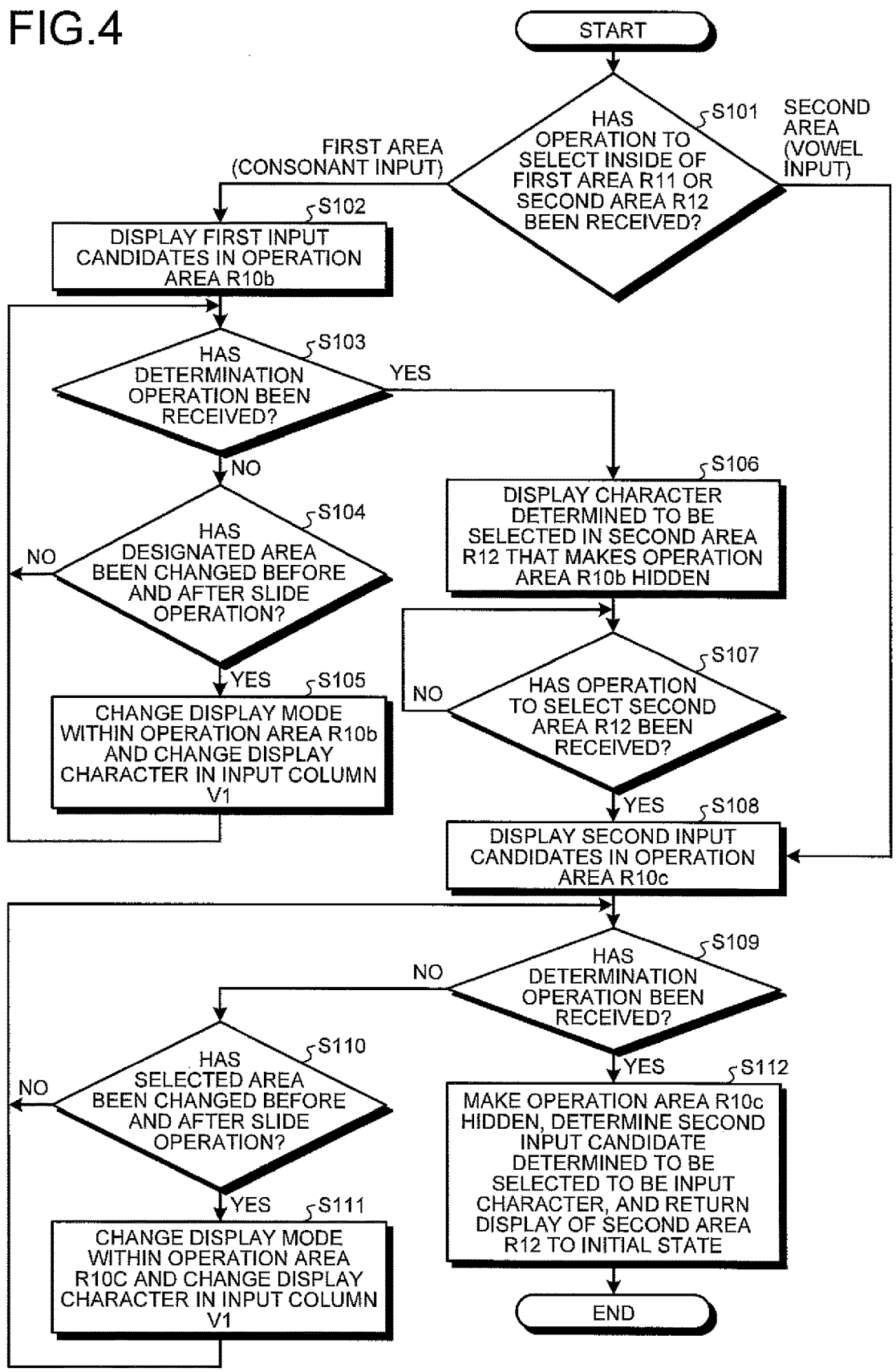
FIG. 4 is a flowchart of the character input processing by the terminal apparatus according to the embodiment.

The following describes character input processing by the terminal apparatus 100 according to the present embodiment with reference to FIG. 4. FIG. 4 is a flowchart of the character input processing by the terminal apparatus 100 according to the present embodiment.

First, it is assumed that the terminal apparatus 100 has been switched to the character input mode, whereby the display control unit 132 displays the operation area R10*a* illustrated in FIG. 1A. In this situation, the first display control unit 132*a* determines whether the receiving unit 131 has received the operation to designate the first area R11, and the second display control unit 132*b* determines whether the receiving unit 131 has received the operation to designate the second area R12 (Step S101).

When the receiving unit 131 has received the operation to select the first area R11, that is, when the user is about to input a consonant, the first display control unit 132*a* displays consonants in the "A row" as the first input candidates in the operation area R10*b* with the display position of the first area R11 at the center, and the input controller 133 displays the character displayed in the first area R11 in the input column V1 (Step S102).

In this state, the first display control unit 132*a* determines whether the receiving unit 131 has received a determination operation to determine the selection of the first input candidate (Step S103). If the determination operation has not been received (No at Step S103), the first display control unit 132*a* determines whether the receiving unit 131 has received a slide operation to designate an area different from the area already designated (Step 3104).

If the slide operation to designate the area different from the area already designated has not been received (No at Step S104), the first display control unit 132*a* waits until it is received. In contrast, if the slide operation to designate the area different from the area already designated has been received (Yes at Step S104), the first display control unit 132*a* displays the first input candidate associated with the area designated by the slide operation in any of the nine areas and makes the first input candidates displayed in the other areas hidden. The input controller 133 displays the character selected by the slide operation in place of the character already displayed in the input column V1 (Step S105).

Referring back to Step S103, if the receiving unit 131 has received the determination operation (Yes at Step S103), the first display control unit 132*a* makes the operation area R10*b* hidden, and the display control unit 132 displays the first input candidate determined to be selected in the second area R12 (Step S106).

In the state in which the selection of the first input candidate has thus been determined, the second display control unit 132*b* determines whether the receiving unit 131 has received the operation to select the second area R12 (Step S107).

If the receiving unit 131 has received the operation to select the second area R12 (Yes at Step S107), the second display control unit 132*b* displays characters corresponding to the determined first input candidate (characters of the "column" containing the determined first input candidate, for example) as the second input candidates in the operation area R10*c* with the display position of the second area R12 at the center (Step S108).

In this state, the second display control unit 132*b* determines whether the receiving unit 131 has received a determination operation to determine the selection of the second input candidate (Step S109). If the determination operation has not been received (No at Step S109), the second display control unit 132*b* determines whether the receiving unit 131 has received a slide operation to designate an area different from the area already designated (Step S110).

If the slide operation to designate the area different from the area already designated has not been received (No at Step S110), the second display control unit 132*b* waits until it is received. In contrast, if the slide operation to designate the area different from the area already designated has been received (Yes at Step S110), the second display control unit 132*b* displays the second input candidate associated with the area designated by the slide operation in any of the nine areas and makes the second input candidates displayed in the other areas hidden. The input controller 133 displays the character selected by the slide operation in place of the character already displayed in the input column V1 (Step S111).

Referring back to Step S109, if the receiving unit 131 has received the determination operation (Yes at Step S109), the second display control unit 132*b* makes the operation area R10*c* hidden, and the input controller 133 determines the second input candidate determined to be selected to be the input character. The display control unit 132 returns the character within the second area R12 to the character in the initial state (Step S112).

The processing procedure of consonant input has so far been described. The following describes vowel input. At Step S101, if the receiving unit 131 has received the operation to select the second area R12, the second display control unit 132*b* displays vowels as the second input candidates in the operation area R10*c* with the display position of the second area R12 at the center, and the input controller 133 displays the character displayed in the second area R12 in the input column V1 (Step S108). The subsequent pieces of processing correspond to Step S108 to Step S112, and descriptions thereof will be omitted.

5. Modifications

The terminal apparatus 100 according to the above embodiment may be implemented in various different forms other than the above embodiment. The following describes other embodiments of the terminal apparatus 100.

5-1. Input Character Determination Processing

The above embodiment describes an example in which the consonant in the "A row" is selected using the operation area R10*b*, and the "column" corresponding to the character selected in the operation area R10*b* is displayed in the operation area R10*c*, whereby a character desired to be input is selected, and the selected character is determined to be the input character. However, the terminal apparatus 100 may determine the input character by the operation area R10*b* alone. The following describes this point with reference to FIGS. 5A to 5G. FIGS. 5A to 5G are diagrams of an example of input character determination processing according to a modification. FIGS. 5A to 5D are similar to FIGS. 1A to 1D, respectively, and descriptions of the processing up to there will be omitted.

The pieces of processing illustrated in FIG. 5A to FIG. 5D correspond to the processing to select a consonant in the "A row." Given this situation, the above embodiment describes a procedure in which the second area R12 is further selected in FIG. 5D, whereby the "column" corresponding to the selected "row" is displayed, and the character actually desired to be input is selected.

However, the character desired to be input may be present in "KA," "SA," "TA," "NA," "HA," "MA," "YA," "RA," and "WA" as the consonants in the "A row." It is assumed that the user desires to input "NASA," for example. For this purpose, it is assumed that processing to input "NA" has been performed as illustrated in FIG. 3A to 5D. In this situation, it is assumed that the user has selected the first area R11 again, not the second area R12. If the operation to select the first area R11, not the second area R12, has thus been received again after the receiving unit 131 has received the determination operation to determine the selection of the first input candidate, the input controller 133 determines the first input candidate determined to be selected to be the input character.

FIG. 5D illustrates a state in which the selection of "NA" is determined, for example. In this state, when the receiving unit 131 has received the selection of the first area R11 again, the input controller 133 determines "NA" already displayed in the input column V1 to be the input character and displays "KA" next to "NA" as illustrated in FIG. 5E.

The user performs the operations illustrated in FIG. 5A to FIG. 5D and can thereby display "NA" in the input column V1, for example. If, although "NA" is already displayed in the input column V1 at this point in time, the operation to select "NA" again from the second input candidates displayed in the operation area R10c by further selecting the second area R12 is required in order to determine "NA" to be the input character, the operation may trouble the user.

However, when the first area R11 has been selected again after the selection of the first input candidate displayed in the operation area R10b has been determined, the terminal apparatus 100 determines the character determined to be selected to be the input character and displays a character ("KA" in the example in FIG. 5E) as a trigger for new character input next to the determined input character, can thereby omit the selection of the second-stage operation for the determination as the input character using the operation area R10c, increasing usability.

5-2. Character Input Processing

The modification describes character input processing by the display of operation areas different from the operation area described in the above embodiment with reference to FIGS. 1A to 10 and FIGS. 3A to 3D. FIGS. 6A to 6M are diagrams of an example of character input processing according to the modification.

In the modification, the display control unit 132 displays the first area R11 and the second area R12 with the same shape at the same position in the operation area R10a. As illustrated in FIG. 6A, the display control unit 132 displays the operation area R10a containing the first area R11 that combines a first area R11A and a first area R11B as the initial state of the character input mode, for example. In this situation, the display control unit 132 displays "A" and "HA" in the first area R11A and the first area R11B, respectively.

In this state, when the receiving unit 131 has received selection to select the first area R11A as illustrated in FIG. 6A, the first display control unit 132a displays "A," "KA," "SA," "TA," and "NA" as the first input candidates in the operation area R10b with the display position of the first area 11A at the center as illustrated in FIG. 6B. The input controller 133 displays "A" in the input column V1.

In this state, when the receiving unit 131 has received a slide operation to designate the area corresponding to "SA" from the area corresponding to "A", the first display control unit 132a displays "SA" in the central area among the nine areas and, except the area originally associated with "SA," makes the first input candidates displayed in the other areas hidden as illustrated in FIG. 6C. The input controller 133 displays "SA" in place of "A" displayed in the input column V1.

In this situation, when the receiving unit 131 has become unable to receive an operation to designate the area corresponding to "SA", that is, when an operation to determine the selection of the first input candidate "SA" has been performed by the user, the first display control unit 132a switches the operation area R10b to be hidden as illustrated in FIG. 6D. The display control unit 132 displays the first input candidate determined to be selected "SA" in the first area R11A.

In the modification, the first area R11A after the selection of the first input candidate has been determined is designated as a second area R12A using the first area R11A in this way.

In this state, when the receiving unit 131 has received an operation to select the second area R12A, the second display control unit 132b displays "SA," "SI," "SU," "SE," and "SO" as the second input candidates in the operation area R10c with the display position of the second area R12A at the center as illustrated in FIG. 6E.

When the receiving unit 131 has received a slide operation to designate the area corresponding to "SI" from the area corresponding to "SA" as illustrated in FIG. 6F, the second display control unit 132b displays "SI" in the central area among the nine areas and, except the area originally associated with "SI," makes the second input candidates displayed in the other areas hidden. The input controller 133 displays "SI" in place of "SA" displayed in the input column V1.

In this situation, when the receiving unit 131 has become unable to receive an operation to designate the area corresponding to "SI", that is, when an operation to determine the selection of the second input candidate "SI" has been performed by the user, the second display control unit 132b switches the operation area R10c to be hidden as illustrated in FIG. 6G, and the input controller 133 determines the second input candidate determined to be selected "SI" to be the input character. The display control unit 132 returns the character within the first area R11A to the initial state "A" from "SA."

The following describes processing when character input is performed using the first area R11B in the first area R11.

When the receiving unit 131 has received selection to select the first area R11B as illustrated in FIG. 6G, the first display control unit 132a displays "HA," "MA," "YA," "RA," and "WA" as the first input candidates in the operation area R10b with the display position of the first area R11B at the center as illustrated in FIG. 6H. The input controller 133 displays "HA" next to "SI" in the input column V1.

In this state, when the receiving unit 131 has received a slide operation to designate the area corresponding to "RA" from the area corresponding to "HA," the first display control unit 132a displays "RA" in the central area among the nine areas as illustrated in FIG. 6I. The input controller 133 displays "RA" in place of "HA" displayed in the input column V1.

In this situation, when the receiving unit 131 has received an operation to determine the selection of the first input candidate "RA," the first display control unit 132a switches the operation area R10*b* to be hidden as illustrated in FIG. 6J. The display control unit 132 displays the first input candidate determined to be selected "RA" in the first area R11B.

In the modification, the first area R11B after the selection of the first input candidate has been determined is designated as a second area R12B using the first area R11B in this way.

In this state, when the receiving unit 131 has received an operation to select the second area R12B, the second display control unit 132*b* displays "RA," "RI," "RU," "RE," and "RO" as the second input candidates in the operation area R10*c* with the display position of the second area R12B at the center as illustrated in FIG. 6K.

When the receiving unit 131 has received a slide operation to designate the area corresponding to "RI" from the area corresponding to "RA," the second display control unit 132*b* displays "RI" in the central area among the nine areas as illustrated in FIG. 6L. The input controller 133 displays "RI" in place of "RA" displayed in the input column V1.

In this situation, when the receiving unit 131 has received an operation to determine the selection of the second input candidate "RI," the second display control unit 132*b* switches the operation area R10*c* to be hidden as illustrated in FIG. 6M, and the input controller 133 determines the second input candidate determined to be selected "RI" to be the input character. The display control unit 132 displays the second input candidate determined to be selected "RI" in the first area R11B. The display control unit 132 returns the character within the second area R12B to the initial state "HA" from "RA."

As described above, in the modification, the terminal apparatus 100 displays "A" to "NA" in the "A row" as the first input candidates in the operation area R10*b* when the first area R11A has been selected, and displays "HA" to "WA" in the "A row" as the first input candidates in the operation area R10*b* when the first area R11B has been selected. When the second area R12A has been selected after the selection of the first input candidate has been determined, the terminal apparatus 100 displays the characters of the "column" corresponding to the first input candidate determined to be selected among "A" to "NA" as the second input candidates in the operation area R10*c*. When the second area R12B has been selected after the selection of the first input candidate has been determined, the terminal apparatus 100 displays the characters of the "column" corresponding to the first input candidate determined to be selected among "HA" to "WA" as the second input candidates in the operation area R10*c*.

The terminal apparatus 100 displays the operation area R10*b* and the operation area R10*c* separately in accordance with the user operation to receive character selection, thereby enables easy character input even with less space, and can thereby provide an input interface having high usability.

5-3. Alphabet Input Processing

In the above embodiment, Japanese character input processing has been described. However, the above character input processing may also be applied to alphabet input. The following modification then describes alphabet character input processing. Specifically, in the above embodiment, an example in which the terminal apparatus 100 displays the operation area corresponding to the "A row" and the operation area corresponding to the "column" stepwise in accordance with the user operation to perform character input has been described. However, in the modification, the terminal apparatus 100 displays alphabet input candidates based on a QWERTY arrangement that is generally employed in keyboards of personal computers or the like. The following describes this point with reference to FIGS. 8A to 8J while referring to an example of the QWERTY arrangement illustrated in FIG. 7. In the following processing, characters to be displayed are alphabets, and the pieces of processing of the respective parts are similar to those described in the above embodiment. Given this situation, detailed descriptions of the respective parts will be omitted.

Figure 7:
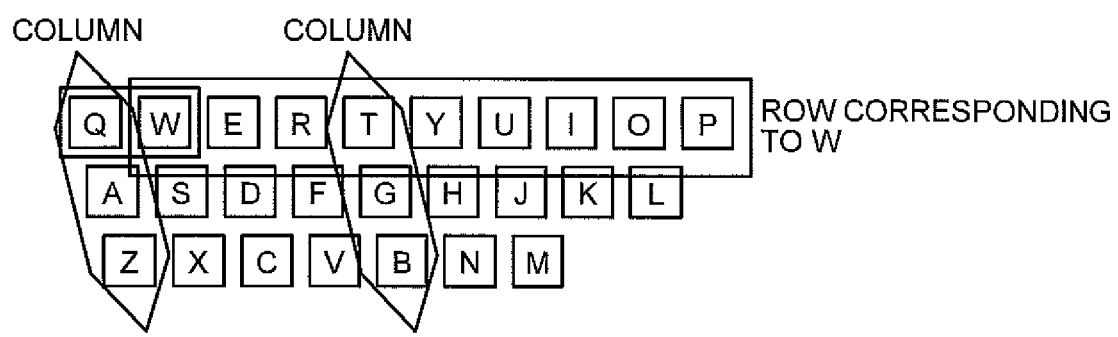
FIG. 7 is a diagram of an example of a QWERTY arrangement according to the modification.
Figure 8A:
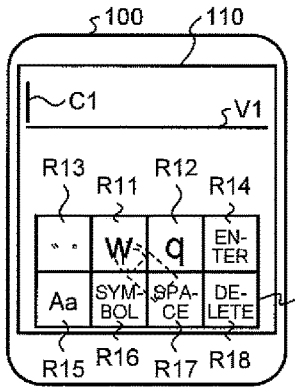
FIGS. 8A to 8J are diagrams of an example of character input processing ready for alphabet input.

FIGS. 8A to 8J are diagrams of an example of character input processing ready for alphabet input. FIG. 8A illustrates a state in which the terminal apparatus 100 has been switched to the character input mode, whereby the display control unit 132 displays the operation area R10*a*. As illustrated in FIG. 8A, the display control unit 132 displays the operation area R10*a* containing the first area R11 and the second area R12 adjacent to each other. The display control unit 132 displays "w" and "q" in the first area R11 and the second area R12, respectively. The characters "w" and "q" are based on the QWERTY arrangement illustrated in FIG. 7.

In this state, when the receiving unit 131 has received selection to select the first area R11 as illustrated in FIG. 8A, the first display control unit 232*a* displays "w," "e," "r," "t," "y," "u," "i," "o," and "p" as the first input candidates in the respective configuration areas in the operation area R10*b* with the display position of the first area R11 at the center as illustrated in 8B. The input controller 133 displays "w" in the input column V1.

Figure 8B:
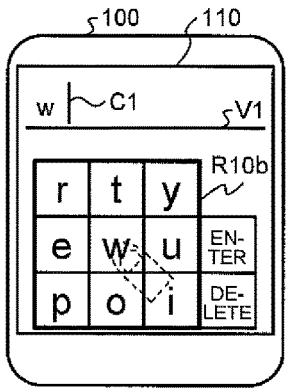
Figure 8C:
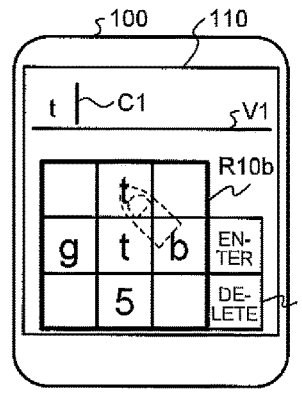

In this state, when the receiving unit 131 has received a slide operation to designate the area corresponding to "t" from the area corresponding to "w," the first display control unit 132*a* displays "g," "t," "b," and "5" in certain areas within the operation area R10*b* as illustrated in FIG. 8C. The input controller 133 displays "t" in place of "w" displayed in the input column V1.

Figure 8D:
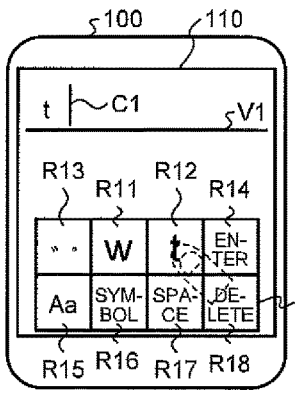

In this situation, when the receiving unit 131 has received a selection operation to select the first input candidate "t", the first display control unit 132*a* switches the operation area R10*b* to be hidden as illustrated in FIG. 8D. The display control unit 132 displays the first input candidate determined to be selected "t" in the second area R12.

Figure 8E:
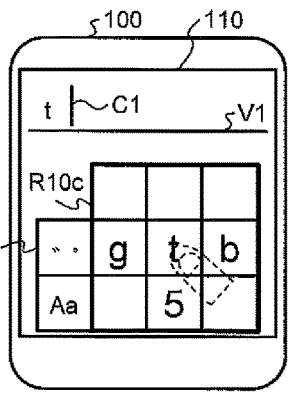

In this state, when the receiving unit 131 has received the operation to select the second area R12, the second display control unit 132*b* displays "g," "t," "b," and "5" as the second input candidates in the operation area R10*c* with the display position of the second area R12 at the center as illustrated in FIG. 8E. These four second input candidates are alphabets contained in the "column" corresponding to the first input candidate determined to be selected "t" in the QWERTY arrangement as illustrated in FIG. 7.

Figure 8F:
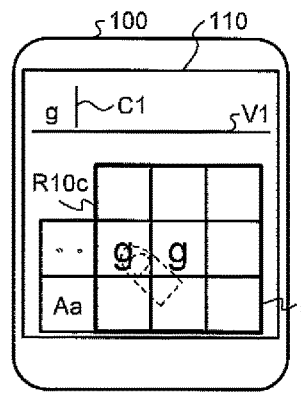

When the receiving unit 131 has received a slide operation to designate the area corresponding to "g" from the area corresponding to "t," the second display control unit 132*b* displays "g" in the central area among the nine areas and, except the area originally associated with "g," makes the second input candidates displayed in the other areas hidden as illustrated in FIG. 8F. The input controller 133 displays "g" in place of "t" displayed in the input column V1.

Figure 8G:
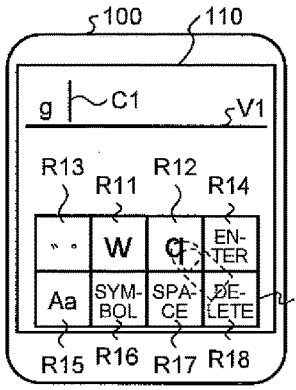

When the receiving unit 131 has received a selection operation to select the second input candidate "g," the second display control unit 132*b* switches the operation area R10*c* hidden as illustrated in FIG. 8G, and the input controller 133 determines the second input candidate determined to be selected "g" to be the input character. The display control unit 132 returns the character within the second area R12 to the initial state "q" from "t".

The following describes input of "q," "a," and "z" in the QWERTY arrangement. FIG. 8A to FIG. 8F describe an example in which "g" is input, and the following then describes a case in which "a" is input as an example.

FIG. 8G illustrates a state in which the display control unit 132 displays the operation area R10a as an initial state. For the input of "q," "a," and "z," a first area R12 is first used. Although the above example is described with the area R12 as the second area R12, for the input of "q," "a," and "z," the area R12 is the first area R12.

Figure 8H:
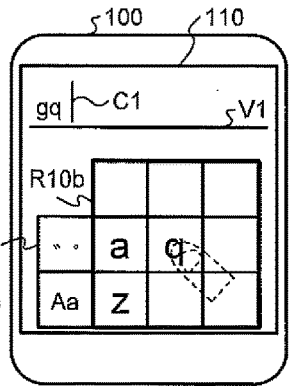

When the receiving unit 131 has received selection to select the first area R12 as illustrated in FIG. 8H, the first display control unit 132a displays "q," "a," and "z" as the first input candidates in the operation area R10b with the display position of the first area 11 at the center as illustrated in FIG. 8H. The input controller 133 displays "q" next to "g" in the input column V1. These three first input candidates are alphabets contained in the "column" corresponding to "q" in the QWERTY arrangement as illustrated in FIG. 7.

Figure 8I:
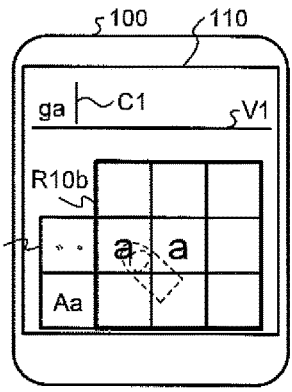

In this state, when the receiving unit 131 has received a slide operation to designate the area corresponding to "a" from the area corresponding to "q," the first display control unit 132a displays "a" in the central area among the nine areas and, except the area originally associated with "a," makes the first input candidates displayed in the other areas hidden as illustrated in FIG. 8I. The input controller 133 displays "a" in place of "q" displayed in the input column V1.

Figure 8J:
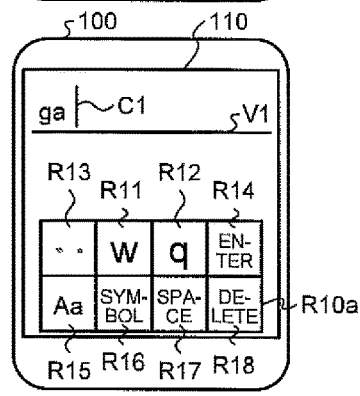

In this situation, when the receiving unit 131 has received a selection operation to select the first input candidate "a," the first display control unit 132a switches the operation area R10b to be hidden as illustrated in FIG. 8J, and the input controller 133 determines the first input candidate determined to be selected "a" to be the input character.

As described above, in the alphabet input, the terminal apparatus 100 displays the alphabets in a row based on the QWERTY arrangement as the first input candidates. After the selection of a certain character is determined in the displayed first input candidates, the terminal apparatus 100 displays the alphabets corresponding to the "column" containing the character determined to be selected to select the input character. With this operation, the terminal apparatus 100 enables easy alphabet input even with less space and can thereby provide an input interface having high usability.

The processing of the form described in FIG. 6 may also be applied to alphabet input. Specifically, the display control unit 132 displays "q" and "y" in the first area R11A and the first area R11B, respectively, in the initial state.

When the receiving unit 131 has received an operation to select the first area R11A, the first display control unit 132a displays "q," "w," "e," "r," and "t" as the first input candidates in the operation area R10b. It is assumed here that a slide operation has been performed from "q" to "t," whereby an operation to select "t" has been received, and the selection has been determined, for example. In this case, the first display control unit 132a makes the operation area R10b hidden, and the display control unit 132 displays "t" in the first area R11A.

When an operation to select the second area R12A (corresponding to the first area R11A) has been received after the selection of the first input candidate "t" has been determined in this way, the second display control unit 132b displays the alphabets ("t," "g," "b," and "5" in this example) contained in the "column" corresponding to the first input candidate determined to be selected ("t" in this example) as the second input candidates.

When the receiving unit 131 has received an operation to select the first area R11B, the first display control unit 132a displays "y," "u," "i," "o," and p" as the first input candidates in the operation area R10b. It is assumed here that a slide operation has been performed from "y" to "u", whereby an operation to select "u" has been received, and the selection has been determined, for example. In this case, the first display control unit 132a makes the operation area R10b hidden, and the display control unit 132 displays "u" in the first area R11A.

When an operation to select the second area R12B (corresponding to the first area R11B) has been received after the selection of the first input candidate "u" has been determined in this way, the second display control unit 132b displays the alphabets ("u," "j," "m," and "7" in this example) contained in the "column" corresponding to the first input candidate determined to be selected ("t" in this example) as the second input candidates.

5-4. Reference Display

The modification "5-3" describes alphabet input based on the QWERTY arrangement. However, when the QWERTY arrangement cannot be recognized at a glance unlike a keyboard, some users may have difficulty in input. As illustrated in FIG. 8B, when the row corresponding to "w" in the QWERTY arrangement is displayed as the first input candidates, some users may fail to immediately recognize what characters are contained in the "column" corresponding to each character contained in the row, for example.

When "g" is desired to be input, for example, "t" should be selected first in FIG. 8B; a user who is not familiar with the QWERTY arrangement cannot immediately recognize that and consequently takes time to find the character desired to be input.

Based on the user characteristics, when any of the first input candidates has been selected, the first display control unit 132a displays the second input candidates corresponding to the selected input candidate in a reference manner in the operation area R10b. The following describes this point with reference to FIG. 8B and FIG. 8C.

FIG. 8B illustrates an example in which the user has designated the first area R11, whereby the first display control unit 132a displays the characters in the row corresponding to "w" in the QWERTY arrangement as the first input candidates. In this state, when any of "e," "r," "t," "y," "u," "i," "o," and "p" has been selected by a slide operation or the like, the first display control unit 132a displays the characters contained in the "column" corresponding to the selected first input candidate, that is, the second input candidates in the operation area R10b in a reference manner.

It is assumed that, in FIG. 8B, the user has performed a slide operation from the area corresponding to "w" to the area corresponding to "t," for example. In that case, the first display control unit 132a displays "g," "t," b," and "5" as the characters contained in the "column" corresponding to the selected first input candidate "t" in certain areas within the operation area R10b in a reference manner.

It is assumed that, in FIG. 8C, the user has performed a slide operation to a right adjacent area. Although the area is blank, the first display control unit 132a associates "y" with the area as illustrated in FIG. 8B. Given this situation, the first display control unit 132a displays "y," "h," "n," and "6" as the characters contained in the "column" corresponding to "y" in certain areas within the operation area R10b in a reference manner.

It is assumed that a further slide operation has been performed from the blank area to a lower adjacent area. Although "b" is displayed in a reference manner in this area in the example in FIG. 8C, the first display control unit 132a associates "u" with the area as illustrated in FIG. 8B. Given this situation, the first display control unit 132a displays "u," "j," "m," and "7" as the characters contained in the "column" corresponding to "u" in certain areas within the operation area R10b in a reference manner.

The reference display can also be applied to Japanese input, not only to alphabet input. It is assumed that, in FIG. 1B, the user has performed a slide operation from the area corresponding to "KA" to the area corresponding to "NA," for example. In this case, the first display control unit 132a displays "NA," "NI," "NU," "NE," and "NO" as the second input candidates corresponding to "NA" in certain areas within the operation area R10b in a reference manner in FIG. 1C, for example.

As describe above, when any of the first input candidates has been selected, the terminal apparatus 100 displays the second input candidates corresponding to the selected input candidate in a reference manner. With this operation, the terminal apparatus 100 enables easy recognition of to which column the character desired to be input belongs, and can thereby provide an input interface having high usability.

5-5. Display Considering Visibility

Although the first area displayed by the first display control unit 132a and the second area displayed by the second display control unit 132b each contain the nine areas in the above embodiment, characters are not necessarily displayed in all the nine areas. When a "column" in the Japanese syllabary is displayed, or when a "column" based on the QWERTY arrangement is displayed, four to five areas are often used (five areas corresponding to "AIUEO," for example), for example. In this case, user visibility may be considered about which areas are used among the nine areas.

Figure 9:
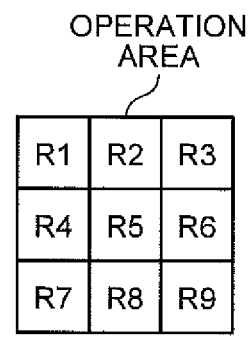
FIG. 9 is a diagram illustrating character display considering visibility.

Specifically, the first display control unit 132a and the second display control unit 132b display input candidates in areas other than areas for which visibility is predicted to reduce by the user operation. The following describes this point with reference to FIG. 9. FIG. 9 is a diagram illustrating character display considering visibility. In this example, the following describes a case in which the respective display controllers display characters in four areas among the areas within the operation areas R10b and R10c and a case in which the user is right-handed. In this example, the first display control unit 132a and the second display control unit 132b are collectively referred to as a display control unit 132ab.

The operation area illustrated in FIG. 9 corresponds to the operation area R10a and the operation area R10b displayed by the first display control unit 132a and the second display control unit 132b, respectively. For the sake of easy description, the respective areas contained in the operation area are attached with RI to R9.

When the area R1 has been selected, for example, the areas R1, R4, R7, and R8 are hidden by a finger, fist, or the like, and visibility for these areas reduces. Given this situation, the display control unit 132ab displays the input candidates in areas other than the areas for which visibility reduces (referred to as fixation areas) R2, R3, R5, and R6 when the area R1 has been selected.

When the area R2 has been selected, for example, visibility for the areas R2, R3, R6, and R9 reduces. Given this situation, the display control unit 132ab displays the input candidates in any of the fixation areas R1, R4, R5, R7, and R8 when the area R2 has been selected.

When the area R4 has been selected, for example, visibility for the areas R4, R7, and R8 reduces. Given this situation, the display control unit 132ab displays the input candidates in any of the fixation areas R1, R2, R3, R5, R6, and R9 when the area R4 has been selected.

When the area R5 has been selected, for example, visibility for the areas R6, R8, and R9 reduces. Given this situation, the display control unit 132ab displays the input candidates in any of the fixation areas R1, R2, R3, R4, and R7 when the area R5 has been selected.

When the area R3, R6, or R9 has been selected, the display control unit 132ab displays the input candidates in any of the fixation areas R1, R2, R4, R5, R7, and R8.

When the area R7 or R8 has been selected, the display control unit 132ab displays the input candidates in any of the fixation areas R1, R2, R3, R4, R5, and R6.

Which areas are designated as the fixation areas for the selected area is not limited to the example illustrated in FIG. 9.

The terminal apparatus 100 thus does not display the input candidates in the areas for which visibility reduces by being selected, displays the input candidates in the areas more easily visually recognized, and can thereby provide an input interface having high usability.

5-6. Hardware Structure

Figure 10:
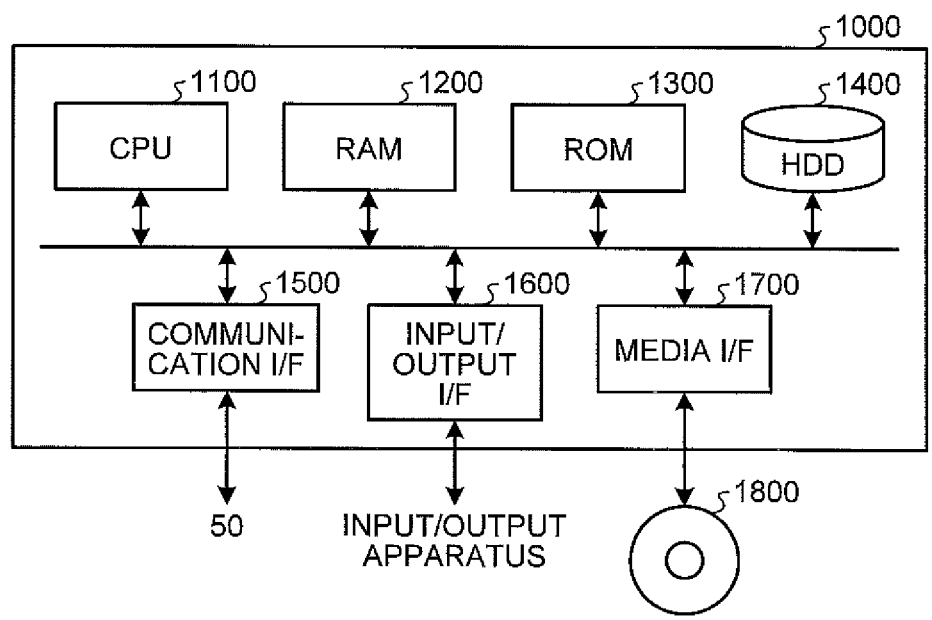
FIG. 10 is a hardware configuration diagram of an example of a computer that implements functions of the terminal apparatus.

The terminal apparatus 100 according to the present embodiment is achieved by a computer 1000 having the structure illustrated in FIG. 10, for example. FIG. 10 is a hardware structural diagram illustrating an example of the computer 1000 that achieves the functions of the terminal apparatus 100. The computer 1000 includes a CPU 1100, a RAM 1200, a read-only memory (ROM) 1300, a hard disk drive (HDD) 1400, a communication interface (I/F) 1500, an input-output interface (I/F) 1600, and a media interface (I/F) 1700.

The CPU 1100 operates on the basis of a computer program stored in the ROM 1300 or the HDD 1400 and controls the respective components. The ROM 1300 stores therein a boot program executed by the CPU 1100 when the computer 1000 is booted and computer programs dependent on the hardware of the computer 1000, for example.

The HDD 1400 stores therein computer programs executed by the CPU 1100 and data used by the computer programs, for example. The communication interface 1500 receives data from another apparatus via a communication network 50 and sends the data to the CPU 1100. The communication interface 1500 transmits data produced by the CPU 1100 to another apparatus via the communication network 50.

The CPU 1100 controls output devices such as a display and a printer and input devices such as a keyboard and a mouse via the input-output I/F 1600. The CPU 1100 acquires data from the input devices via the input-output I/F 1600. The CPU 1100 outputs produced data to the output devices via the input-output I/F 1600.

The media I/F 1700 reads a computer program or data stored in a recording medium 1800 and provides the data to the CPU 1100 via the RAM 1200. The CPU 1100 loads the computer program in the RAM 1200 from the recording medium 1800 via the media I/F 1700 and executes the loaded computer program. The recording medium 1800 is an optical recording medium such as a digital versatile disc (DVD) or a phase change rewritable disc (PD), a magneto-optical recording medium such as a magneto-optical disc (MO), a tape medium, a magnetic recording medium, or a semiconductor memory.

For example, when the computer 1000 functions as the terminal apparatus 100 according to the present embodiment, the CPU 1100 of the computer 1000 executes the computer program loaded in the RAM 1200 to achieve the functions of the control unit 130. The CPU 1100 of the computer 1000, which reads the computer programs from the recording medium 1800 and executes them, may acquire the computer programs from another device via the communication network 50.

6. Others

In the processes described in the present embodiment, all or a part of the processes described to be automatically performed can also be manually performed. Alternatively, all or a part of the processes described to be manually performed can also be automatically performed by known methods. In addition, the processing procedures, the specific names, and information including various types of data and parameters described in the above description and drawings can be changed as required unless otherwise specified. For example, the various types of information illustrated in the respective drawings are not limited to them.

Furthermore, the components of the devices illustrated in the drawings are functionally conceptual, and are not always required to be physically configured as illustrated in the drawings. That is, specific forms of distribution and integration of the devices are not limited to those illustrated in the drawings. All or a part of the devices can be configured to be functionally or physically distributed or integrated in any desired units in accordance with various loads, the usage states, and the like.

The embodiments described above can be combined as appropriate without inconsistency among them.

7. Advantageous Effects

The terminal apparatus 100 according to the above-described embodiment includes the receiving unit 131, the first display control unit 132a, and the second display control unit 132b. The receiving unit 131 receives an operation to designate the first area. The first display control unit 132a displays the first input candidates when the receiving unit 131 has received the operation to designate the first area. The second display control unit 132b displays the second input candidates corresponding to the first input candidate determined to be selected among the first input candidates when an operation to designate the second area has been received.

The terminal apparatus 100 according to the present embodiment thus displays the first input candidates and the second input candidates separately in accordance with the user operation to receive character selection, can thereby achieve an input procedure with which the user is familiar, that is, from "row" to "column" in Japanese, for example, and can provide an input interface that enables high-precision character input.

The second display control unit 132b, when the operation to designate the second area R12 has been received after the operation to determine the selection of any of the first input candidates displayed by the first display control unit 132a has been performed, displays the second input candidates corresponding to the first input candidate determined to be selected.

The terminal apparatus 100 according to the present embodiment thus displays the first input candidates and the second input candidates separately in accordance with the user operation to receive character selection, and can thereby provide an input interface that enables high-precision character input.

The first display control unit 132a displays the first input candidates in the area with the first area R11 at the center, whereas the second display control unit 132b displays the second input candidates corresponding to the first input candidate determined to be selected in the area with the second area R12 at the center.

The terminal apparatus 100 according to the present embodiment thus displays the first input candidates in the operation area R10b with the first area R11 at the center and displays the second input candidates in the operation area R10c with the second area R12 at the center, thereby enables character input with less space, and can thereby provide an input interface having high usability.

The second display control unit 132b, when the operation to designate the second area displayed at the position adjacent to the first area has been received, displays the second input candidates in the area with the second area at the center.

With this operation, the terminal apparatus 100 according to the present embodiment enables easy character input with less space and can thereby provide an input interface having high usability.

The second display control unit 132b, when the operation to designate the second area displayed at the same position with the first area has been received, displays the second input candidates in the area with the second area at the center.

With this operation, the terminal apparatus 100 according to the present embodiment enables easy character input with less space and can thereby provide an input interface having high usability.

The second display control unit 132b, when the operation to designate the second area has been received, displays the second input candidates in the area with the second area at the center and that overlaps with the area in which the first input candidates are displayed at least partially.

With this operation, the terminal apparatus 100 according to the present embodiment enables easy character input with less space and can thereby provide an input interface having high usability.

The first display control unit 132a displays the first input candidates in the areas other than the areas for which visibility is predicted to reduce based on the user operation in the area with the first area at the center.

With this operation, the terminal apparatus 100 according to the present embodiment can display the input candidates in the area that is easy for the user to visually recognize, and can thereby provide an input interface having high usability.

The second display control unit 132b displays the second input candidates in the areas other than the areas for which visibility is predicted to reduce based on the user operation in the area with the second area at the center.

With this operation, the terminal apparatus 100 according to the present embodiment can display the input candidates in the area that is easy for the user to visually recognize, and can thereby provide an input interface having high usability.

When any of the first input candidates has been selected, the first display control unit 132a displays the second input candidates corresponding to the selected first input candidate in a state of not capable of being selected in the area with the first area at the center.

With this operation, the terminal apparatus 100 according to the present embodiment can also display the second input candidates corresponding to the selected first input candidate when the first input candidate is selected, and can thereby perform accurate, smooth character input.

When any of the second input candidates displayed by the second display control unit 132b has been selected, the input controller 133 displays the selected second input candidate in the input column and determines the second input candidate displayed in the input column to be the input character.

With this operation, the terminal apparatus 100 according to the present embodiment can perform character input by stepwise selection operations, enables accurate character input, and can thereby provide an input interface having high usability.

When any of the first input candidates has been selected, the input controller 133 displays the selected first input candidate in the input column and, when any of the second input candidates corresponding to the first input candidate has been selected, the input controller 133 displays the selected second input candidate in the input column in place of the first input candidate displayed in the input column.

With this operation, the terminal apparatus 100 according to the present embodiment enables character input by the stepwise selection operations, thereby enables accurate character input, and can thereby provide an input interface having high usability.

When any of the first input candidates has been selected, the input controller 133 displays the selected first input candidate in the input column and, when any of the first input candidates has been selected again after any of the first input candidates has been selected, the input controller 133 determines the first input candidate already displayed in the input column to be the input character.

With this operation, the terminal apparatus 100 according to the present embodiment can omit the second-stage operation and can thereby perform smooth character input.

The first display control unit 132a displays the characters corresponding to the A row in the Japanese syllabary as the first input candidates, whereas the second display control unit 132b displays the characters of the column in the Japanese syllabary corresponding to a character selected from the characters in the A row displayed by the first display control unit as the second input candidates.

With this operation, the terminal apparatus 100 according to the present embodiment performs the two-stage selection operations corresponding to the "row" and the "column" and can thereby perform easy, accurate character input.

The first display control unit 132a displays certain characters based on the QWERTY arrangement as the first input candidates, whereas the second display control unit 132b displays characters that correspond to a character selected from the characters displayed by the first display control unit and are based on the QWERTY arrangement as the second input candidates.

The second display control unit 132b, when the operation to designate the second area R12 has been received without designating the first area R11, displays the second input candidates in the area with the second area R12 at the center.

With this operation, the terminal apparatus 100 according to the present embodiment eliminates the need to perform the two-stage operations, that is, the first input candidate is selected by designating the first area R11, and the second input candidate is then selected by designating the second area R12 and can thereby perform quick character input.

The second display control unit 132b displays the characters according to the A row in the Japanese syllabary as the second input candidates.

With this operation, the terminal apparatus 100 according to the present embodiment, when the A row in the Japanese syllabary is input, can perform quick character input with a one-stage operation.

With this operation, the terminal apparatus 100 according to the present embodiment can perform easy, accurate character input.

Some embodiments of the present application are described in detail with reference to the accompanying drawings by way of example. The present invention can be implemented in other embodiments changed or modified on the basis of the knowledge of the persons skilled in the art, besides the embodiments described herein.

The term "unit" described above can be replaced with a "section", a "module", or a "circuit", for example. For example, the receiving can be replaced with a receiving section or a receiving circuit.

An aspect of an embodiment has an advantageous effect of being capable of enhancing the usability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal apparatus comprising:
a processor programmed to:
    receive an operation to designate a first area in which a predetermined character is displayed;
    in response to receiving the operation to designate the first area, display first input candidates such that the designated first area is at a center of the displayed first input candidates, and display the predetermined character in a predetermined input column;
    change the predetermined character displayed in the predetermined input column to a selected first input candidate of the displayed first input candidates and display only the selected first input candidate in a second area displayed at a position adjacent to the first area, when the selection of any of the first input candidates has been performed;
    in response to receiving an operation to designate the second area in which only the selected first input candidate is displayed, hide the first input candidates and the first area, and display second input candidates corresponding to the selected first input candidate such that the second area is at a center of the displayed second input candidates, the operation changing the selected first input candidate displayed in the predetermined input column to an arbitrary character; and
    display a selected second input candidate at a position of the previously displayed first input candidate in the predetermined input column, in response to selection of any one of the second input candidates.

2. The terminal apparatus according to claim 1, wherein the processor programmed to, when the operation to designate the second area has been received after an operation to determine the selection of any of the displayed first input candidates has been performed, display the second input candidates corresponding to the first input candidate determined to be selected.

3. The terminal apparatus according to claim 1, wherein the processor programmed to, when the operation to designate the second area displayed at a same position as the first area has been received, display the second input candidates in an area with the second area at a center.

4. The terminal apparatus according to claim 1, wherein the processor programmed to, when the operation to designate the second area has been received, display the second input candidates in an area with the second area at the center, the area overlapping with an area in which the first input candidates are displayed at least partially.

5. The terminal apparatus according to claim 1, wherein the processor programmed to display the first input candidates in areas other than areas for which visibility is predicted to reduce based on a user operation in an area with the first area at a center.

6. The terminal apparatus according to claim 1, wherein the processor programmed to display the second input candidates in areas other than areas for which visibility is predicted to reduce based on a user operation in an area with the second area at a center.

7. The terminal apparatus according to claim 1, wherein the processor programmed to, when any of the first input candidates has been selected, display the second input candidates corresponding to the selected first input candidate in a state of not capable of being selected, in an area with the first area at a center.

8. The terminal apparatus according to claim 1, wherein the processor programmed to, when any of the displayed second input candidates has been selected, display the selected second input candidate in the predetermined input column, and determine the second input candidate displayed in the predetermined input column to be an input character.

9. The terminal apparatus according to claim 8, wherein the processor programmed to, when any of the first input candidates has been selected, display the selected first input candidate in the predetermined input column, and when any of the first input candidates has been selected again after any of the first input candidates has been selected, determine the first input candidate displayed in the predetermined input column to be the input character.

10. The terminal apparatus according to claim 1, wherein the processor is programmed to:
    display ten Japanese characters ending with an "a" when pronounced in the Japanese syllabary as the first input candidates, when receiving the operation to designate the first area; and
    display characters that are pronounced by combining consonants included in the selected character among the first input candidates and vowels included in characters not displayed as the first input candidates, as the second input candidates.

11. The terminal apparatus according to claim 1, wherein the processor programmed to:
    display certain characters based on a QWERTY arrangement as the first input candidates, and
    display characters that correspond to a character selected from the displayed characters and that are based on the QWERTY arrangement, as the second input candidates.

12. The terminal apparatus according to claim 1, wherein the processor programmed to, when the operation to designate the second area has been received without designating the first area, display the second input candidates in the area with the second area at the center.

13. A terminal control method that is executed by a computer, the terminal control method comprising:
    receiving an operation to designate a first area in which a predetermined character is displayed;
    in response to receiving the operation to designate the first area, displaying first input candidates such that the designated first area is at a center of the displayed first input candidates, and display the predetermined character in a predetermined input column;
    changing the predetermined character displayed in the predetermined input column to a selected first input candidate of the displayed first input candidates and displaying only the selected first input candidate in a second area displayed at a position adjacent to the first area, when the selection of any of the first input candidates has been performed;
    in response to receiving an operation to designate the second area in which only the selected first input candidate is displayed, hiding the first input candidates and the first area, and displaying second input candidates corresponding to the selected first input candidates, the operation changing the selected first input candidate displayed in the predetermined input column to an arbitrary character; and
    displaying a selected second input candidate at a position of the previously displayed first input candidate in the predetermined input column, in response to selection of any one of the second input candidates.

14. A non-transitory computer readable storage medium having stored therein a terminal control program that causes a computer to execute:
    receiving an operation to designate a first area in which a predetermined character is displayed;
    in response to receiving the operation to designate the first area, displaying first input candidates such that the designated first area is at a center of the displayed first input candidates, and displaying the predetermined character in a predetermined input column;
    changing the predetermined character displayed in the predetermined input column to a selected first input candidate of the displayed first input candidates and displaying only the selected first input candidate in a second area displayed at a position adjacent to the first area, when the selection of any of the first input candidates has been performed;
    in response to receiving an operation to designate the second area in which only the selected first input candidate is displayed, hiding the first input candidates and the first area, and displaying second input candidates corresponding to the selected first input candidate such that the second area is at a center of the displayed second input candidates, the operation changing the selected first input candidate displayed in the predetermined input column to an arbitrary character; and
    displaying a selected second input candidate at a position of the previously displayed first input candidate in the predetermined input column, in response to selection of any one of the second input candidates.

* * * * *